United States Patent
Kinoshita

(10) Patent No.: US 7,615,897 B2
(45) Date of Patent: Nov. 10, 2009

(54) COOLING DEVICE OF MOTOR

(75) Inventor: Kanjirou Kinoshita, Sakai (JP)

(73) Assignee: Daikin Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 10/592,639

(22) PCT Filed: Mar. 23, 2005

(86) PCT No.: PCT/JP2005/005278

§ 371 (c)(1),
(2), (4) Date: Sep. 13, 2006

(87) PCT Pub. No.: WO2005/091471

PCT Pub. Date: Sep. 29, 2005

(65) Prior Publication Data

US 2008/0018183 A1    Jan. 24, 2008

(30) Foreign Application Priority Data

Mar. 24, 2004  (JP) ............................. 2004-086818

(51) Int. Cl.
*H02K 9/06* (2006.01)
*F04D 29/38* (2006.01)
(52) U.S. Cl. ............................. 310/63; 310/52; 310/58; 310/60 R; 310/62; 310/89
(58) Field of Classification Search ............... 310/52, 310/58, 60 R, 62, 63; *H02K 9/06; F04D 29/38*
See application file for complete search history.

(56) References Cited

U.S. PATENT DOCUMENTS 2,778,958 A * 1/1957 Hamm et al. ............... 310/57
2,970,233 A * 1/1961 Penney James H ........... 310/63
3,725,706 A * 4/1973 Lukens ....................... 310/62
3,749,953 A * 7/1973 Baumann et al. ............. 310/62

(Continued)

FOREIGN PATENT DOCUMENTS

JP          62-16040 A     1/1987

(Continued)

OTHER PUBLICATIONS

English translation of JP11-289716.*

(Continued)

*Primary Examiner*—Quyen Leung
*Assistant Examiner*—John K Kim
(74) *Attorney, Agent, or Firm*—Birch, Stewart, Kolasch & Birch, LLP

(57) ABSTRACT

A motor cooling device including an impeller 2, supported by a rotary shaft 1a of a motor 1, and a fan cover 4, which encases a front portion and a peripheral portion of the impeller 2 and has an air inlet 5 in a front surface and an air outlet 6 in the rear. A constricting flow space $S_1$ is arranged at an exit side of the impeller 2 and defined by a motor end surface 1b, which includes an entrance in the proximity of a rear surface of a vane 3 of the impeller 2 and a circumferential surface expanding radially and diagonally in the rearward direction, and a space formation member 10, which is formed on an inner surface of the fan cover 4.

8 Claims, 3 Drawing Sheets

U.S. PATENT DOCUMENTS

| | | | |
|---|---|---|---|
| 3,800,173 A * | 3/1974 | Rosenberry, Jr. | 310/59 |
| 4,152,094 A * | 5/1979 | Honda et al. | 415/119 |
| 4,186,317 A * | 1/1980 | Sisk | 310/60 R |
| 4,828,456 A * | 5/1989 | Bodzian et al. | 415/211.1 |
| 5,149,997 A | 9/1992 | Suomela | |
| 7,169,439 B2 * | 1/2007 | Pendleton et al. | 427/140 |
| 2006/0175915 A1 * | 8/2006 | Voigt et al. | 310/58 |
| 2006/0181162 A1 * | 8/2006 | Pierret et al. | 310/58 |

FOREIGN PATENT DOCUMENTS

| | | | |
|---|---|---|---|
| JP | 4-506746 A | 11/1992 | |
| JP | 5-4763 U | 1/1993 | |
| JP | 7-222402 A | 8/1995 | |
| JP | 9-9573 A | 1/1997 | |
| JP | 11-289716 A | 10/1999 | |
| WO | WO 2004040738 A1 * | 5/2004 | |

OTHER PUBLICATIONS

Yamada et al (JP11-289716, Machine translated).*

JP 11—289716_EN.pdf : Yamada et al JP 11-289716, IDS, English translation.*

JP 11-289716_EN.pdf : Yamada et al, JP 11-289 (IDS) English translation completed Jan. 18, 2008.*

* cited by examiner

COOLING DEVICE OF MOTOR

TECHNICAL FIELD

The present invention relates to a cooling device for a motor, and more particularly, to a motor cooling device formed to efficiently cool the periphery of a motor stator.

BACKGROUND ART

FIG. 6 shows a cooling device for a motor in the prior art. The cooling device includes a radial plate type impeller 2, which is supported by a rotary shaft 1a of a motor 1, and a fan cover 4, which encases the impeller 2 and which is formed from metal plates. Reference numbers 3, 5, and 6 respectively denote a vane, an air inlet, and an air outlet. In a cooling device having such a structure, the radial plate type impeller 2 is just encased in the fan cover 4. Thus, the air flow produced by the impeller 2 can only be expected to be directed toward the surface of the motor 1. Accordingly, application of the cooling device to a compact high-output motor results in a problem in which the fan capability causes insufficient cooling. Application of the cooling device to a high speed motor results in a problem in which the fan operation noise increases.

Various measures have been taken to solve the above problems. Japanese Laid-Open Patent Publication No. 11-289716 describes a cooling device in which an air flow passage of a motor cooling fan is diagonal to the rotary shaft. Additionally, the vanes have an outer diameter that is greater than the outer diameter of the housing of the motor.

DISCLOSURE OF THE INVENTION

In the above cooling device, the flow producing capability is improved. However, the problem in which the operation noise is high is not solved. Further, no consideration is made to effectively convert the dynamic pressure of the air flow produced by the impeller into static pressure. Additionally, no consideration is made to send a converged air flow to the surface of motor cooling fins. Accordingly, there has been no proposal of a cooling device having a simple structure that improves the cooling capability while reducing operation noise.

Accordingly, it is an object of the present invention to provide a cooling device having a simple structure that improves the cooling capability while reducing operation noise.

To achieve the above object, in one aspect of the present invention, a motor cooling device includes an impeller, which is supported by a rotary shaft of a motor, and a fan cover, which encases a front portion and a peripheral portion of the impeller and has an air inlet in a front surface and an air outlet in the rear. The motor cooling device includes a constricting flow space arranged at an exit side of the impeller and defined by a motor end surface, which includes an entrance in the proximity of a rear surface of a vane of the impeller and a circumferential surface expanding radially and diagonally in the rearward direction, and a space formation member, which is formed on an inner surface of the fan cover.

With this structure, a rotation direction flow at the exit side of the impeller is shifted and rectified to an axial flow in the constricting flow space. This improves the operation noise characteristic. Accordingly, high speed operation is enabled without increasing the operation noise. Further, the cooling capability is improved.

An enlarging flow passage enlarged toward the air outlet may be arranged downstream from the constricting flow space. With such a structure, a diffuser effect occurs in the enlarging flow passage and converts the dynamic pressure of the generated flow to dynamic pressure. This improves the aerodynamic capability (i.e., cooling capability).

The enlarging flow passage may include a downstream end encasing an end portion of a cooling fin of the motor or facing toward the end portion of the cooling fin. This forms a converging flow directed toward the cooling fin and improves the cooling capability.

A radial plate impeller may be employed as the impeller 2. In such a structure, since the capability of the radial plate impeller does not vary even if the rotation direction of the impeller changes, rotation is reversible. Further, since the vane exit angle is 90°, the static pressure produced by the impeller 2 is greater than that produced by vanes facing forward or rearward directions. This enables an increase in the impeller capability.

A propeller fan impeller is employed as the impeller. In such a structure, since the front rim of the vane of the propeller fan impeller faces toward the air entering direction, smooth entrance of air is enabled and the operation noise is reduced. Accordingly, high speed operation is enabled, and the cooling capability is improved.

BEST MODE FOR CARRYING OUT THE INVENTION

Several preferred embodiments of the present invention will now be discussed with reference to the attached drawings.

Figure 1:
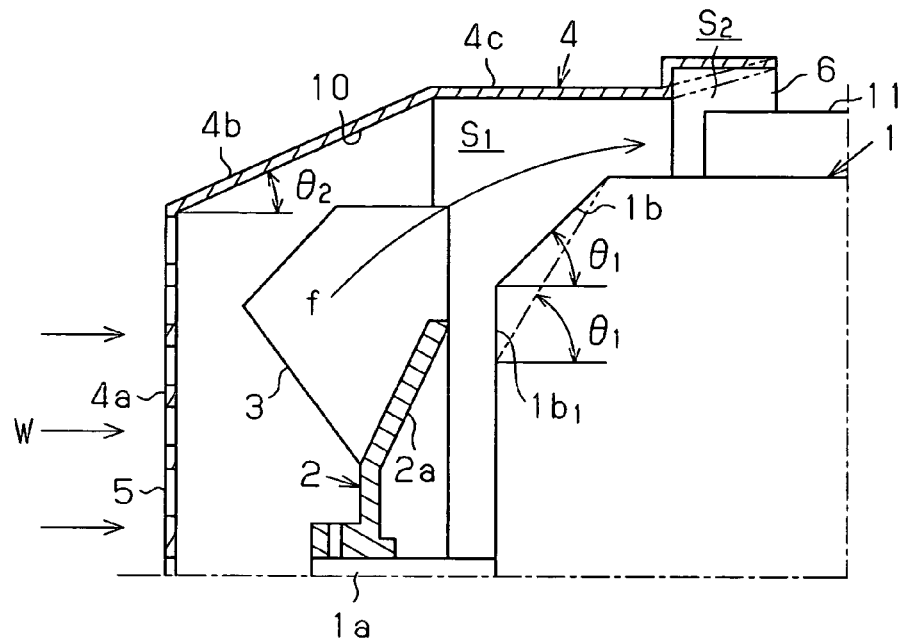
FIG. 1 is a cross-sectional view showing a motor cooling device according to a first embodiment of the present invention.

FIG. 1 shows a motor cooling device according to a first embodiment of the present invention.

The motor cooling device includes an impeller 2, which is supported by a rotary shaft 1a of a motor 1, and a fan cover 4, which encases front and peripheral portions of the impeller 2 and which includes an air inlet 5 in the front and an air outlet 6 in the rear. In the present embodiment, the impeller 2 is a radial plate impeller having vanes 3 with an exit angle of 90°. In such a structure, the capability of the radial plate impeller does not vary even if the rotation direction of the impeller changes. Thus, rotation is reversible. Further, since the vane exit angle is 90°, the static pressure produced by the impeller 2 is greater than that produced by vanes facing forward or rearward directions. This enables an increase in the impeller capability.

The fan cover 4 has a front surface 4a, in which the air inlet 5 is formed, a conical portion 4b, which is inclined from the front surface 4a in the downstream direction, and a generally cylindrical portion 4c, which extends from the downstream end side of the conical portion 4b toward the air outlet 6.

A constricting flow space $S_1$ arranged at the exit side of the impeller 2 is defined by a motor end surface 1b, which has an entrance in the proximity of the rear surface of the vane 3 of the impeller 2 and a circumferential surface expanding radially and diagonally in the rearward direction, and a space formation member 10, which is formed on the inner surface of the fan cover 4. The motor end surface 1b may have a front end $1b_1$ extending either outward from the outer diameter of a hub 2a of the impeller 2 as shown by the solid line or inward from the outer diameter of the hub 2a of the impeller 2 as shown by the broken line.

In the preferred embodiment, the space formation member 10 is the inner surface of the conical portion 4b in the fan cover 4. Instead, a member forming the space formation member 10 may be attached to the inner surface of the fan cover conical portion 4b. The constricting flow space $S_1$ is formed with the space formation member 10 having an enlarging angle $\theta_2$ that is set to be smaller than an enlarging angle $\theta_1$ of the motor end surface 1b.

An enlarging flow passage $S_2$, which is enlarged toward the air outlet 6, is arranged downstream from the constricting flow space $S_1$. The enlarging flow passage $S_2$ may be formed by bending and enlarging a downstream end portion of the cylindrical portion 4c in the fan cover 4 as shown by the solid lines in the drawing or by gradually enlarging the downstream end portion as shown by the broken lines in the drawing. Further, the downstream end of the enlarging flow passage $S_2$ encases the end portion of a cooling fin 11 of the motor 1. The downstream end of the enlarging flow passage $S_2$ may face towards the end portion of the cooling fin 11 of the motor 1.

With the above structure, a rotation direction flow at the exit side of the impeller 2 is shifted and rectified to an axial flow in the constricting flow space $S_1$. This improves the operation noise characteristic. Further, a diffuser effect occurs in the enlarging flow passage $S_2$ and effectively converts the dynamic pressure of the generated flow to dynamic pressure. This improves the aerodynamic capability (i.e., cooling capability), forms a converging flow directed toward the cooling fin 11, and improves the cooling capability. The axial position of the downstream end of the enlarging flow passage $S_2$ may be varied in the circumferential direction.

Figure 2:
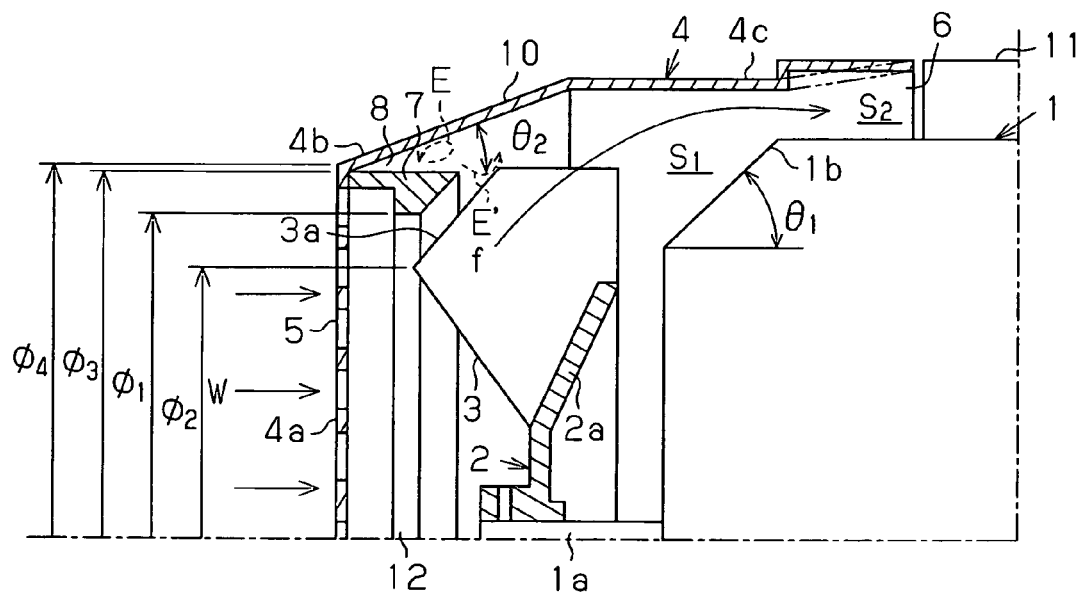
FIG. 2 is a cross-sectional view showing a motor cooling device according to a second embodiment of the present invention.

FIG. 2 shows a motor cooling device according to a second embodiment of the present invention.

In this case, the fan cover 4 includes an annular partition plate 7, which extends from the peripheral portion of the air inlet 5 (i.e., peripheral portion of the front surface 4a of the fan cover 4) toward the front surface 3a of the vane 3 of the impeller 2. An annular hollow portion 8 is formed between the peripheral side of the partition plate 7 and the inner surface of the fan cover 4. As a result, negative pressure is generated by a cavity effect of an eddy E produced in the hollow portion 8, which is formed between the peripheral side of the partition plate 7 and the inner surface of the fan cover 4. The negative pressure draws a main air flow f, which passes by the impeller 2, toward the distal side of the vane 3 of the impeller 2. Consequently, the vane surface of the impeller 2 functions effectively to improve the aerodynamic capability (i.e., cooling capability) and operation noise characteristic of the impeller 2.

The partition plate 7 is cylindrical. An inwardly extending flange 12 having a trapezoidal cross-section and including an inclined surface parallel to the front surface 3a of the vane 3 of the impeller 2 is formed integrally with the distal portion of the partition plate 7. This arranges the inwardly extending flange 12 of the partition plate 7 in the proximity of vane front surface 3a so that the cavity effect of the hollow portion 8 becomes further prominent.

The partition plate 7 has an inner diameter $\Phi_1$, which is larger than the inner diameter $\Phi_2$ of the front surface distal portion 3a of the vane 3. This reduces the exfoliating region and further improves the aerodynamic capability (i.e., cooling capability) and operation noise characteristic of the impeller 2.

Further, the partition plate 7 has an outer diameter $\Phi_3$, which is smaller than the outer diameter $\Phi_4$ of the impeller 2. This adds an effect that forms a circulation flow E' in addition to the cavity effect of the hollow portion 8. Thus, the vane surface functions further effectively, and the aerodynamic capability (i.e., cooling capability) and operation noise characteristic of the impeller 2 are further improved.

In the present embodiment, the partition plate 7 and the fan cover 4 are an integral molded product made of synthetic resin. However, the partition plate 7 may be detachable from the fan cover 4. If the partition plate 7 is detachable from the fan cover 4, specification changes would be facilitated by preparing various types of partition plates 7 so that the partition plate 7 can be changed without changing the shape of the fan cover 4.

In the present embodiment, the downstream end of the enlarging flow passage $S_2$ faces toward the end portion of the cooling fin 11 of the motor 1. However, in the same manner as in the first embodiment, the downstream end of the enlarging flow passage $S_2$ may encase the end portion of the cooling fin 11 of the motor 1.

The remaining structure and advantages are the same as the first embodiment and thus will not be described.

Figure 3:
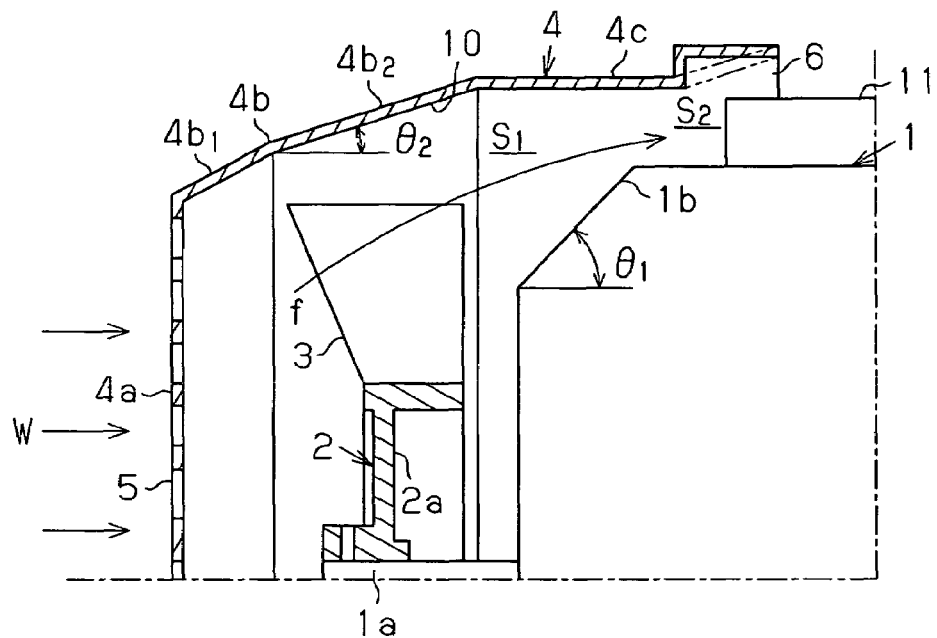
FIG. 3 is a cross-sectional view showing a motor cooling device according to a third embodiment of the present invention.

FIG. 3 shows a motor cooling device according to a third embodiment of the present invention.

In this case, a propeller fan impeller having vanes with front rims facing toward the air entering direction is employed as the impeller 2. The conical portion 4b of the fan cover 4 includes a first conical portion $4b_1$, which is located toward the front surface 4a, and a second conical portion $4b_2$, of which inclination is greater than that of the first conical portion $4b_1$. The inner surface of the second conical portion $4b_2$ forms the space formation member 10 of the constricting flow space $S_1$. In the present embodiment, the downstream end of the enlarging flow passage $S_2$ encases the end portion of the cooling fin 11 of the motor 1. However, in the same manner as in the second embodiment, the downstream end of the enlarging flow passage $S_2$ may face towards the end portion of the cooling fin 11 of the motor 1. In such a case, since the front rims of the vanes of the propeller fan impeller 2 face toward the air entering direction, smooth entrance of air is enabled and the operation noise is reduced. Accordingly, high speed operation is enabled, and the cooling capability is improved.

The remaining structure and advantages are the same as the first embodiment and thus will not be described.

Figure 4:
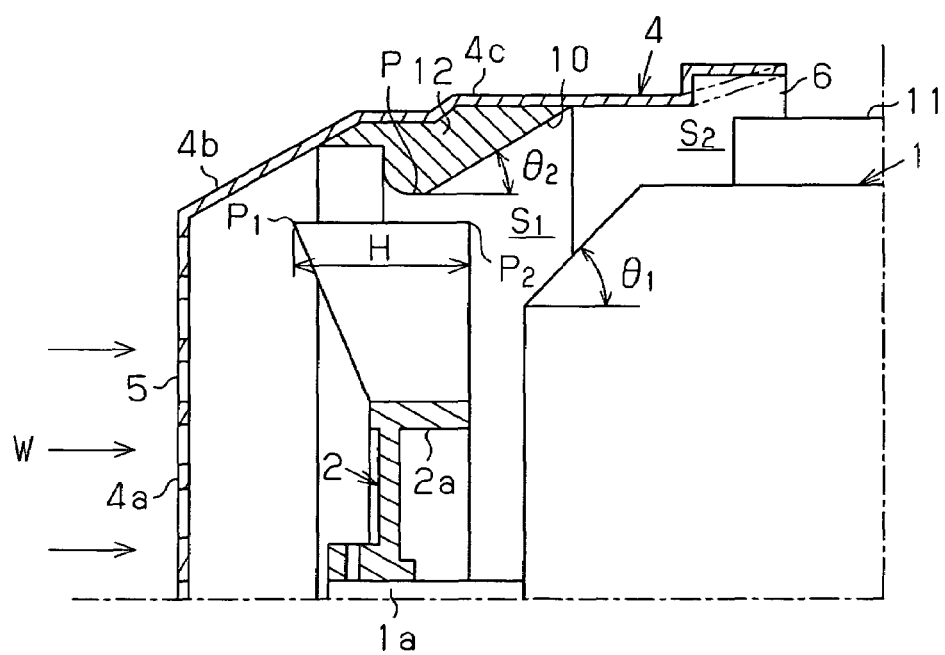
FIG. 4 is a cross-sectional view showing a motor cooling device according to a fourth embodiment of the present invention.

FIG. 4 shows a motor cooling device according to a fourth embodiment of the present invention.

In this case, a propeller fan impeller having vanes with front rims facing toward the air entering direction is employed as the impeller 2. An annular fan guide 12 is arranged on the inner surface of the generally cylindrical portion 4c of the fan cover 4 at a portion generally facing towards the periphery of the propeller fan impeller 2. The fan guide 12 is formed so that it suddenly becomes small in the flow direction at the inlet side, its smallest cross-section position P is located within the range of the peripheral end of the vane 3 of the propeller fan impeller 2, and its outlet side inner surface forms an inclined surface that is gradually enlarged. The inclined surface forms the space formation member 10 of the constricting flow space $S_1$. Accordingly, the fan guide 12, which defines an inlet region and an outlet region of the propeller fan impeller 2, also functions as the space formation member 10. When H represents the height from the front rim peripheral position $P_1$ of the vane 3 to the vane rear rim peripheral position $P_2$, it is preferred that the smallest cross-section position P be in the range of 0.5H through H from the front end peripheral position $P_1$ of the vane 3. In the present embodiment, the downstream end of the enlarging flow passage $S_2$ encases the end portion of the cooling fin 11 of the motor 1. However, in the same manner as in the second embodiment, the downstream end of the enlarging flow passage $S_2$ may face towards the end portion of the cooling fin 11 of the motor 1.

The remaining structure and advantages are the same as the first and third embodiments and thus will not be described.

Figure 5:
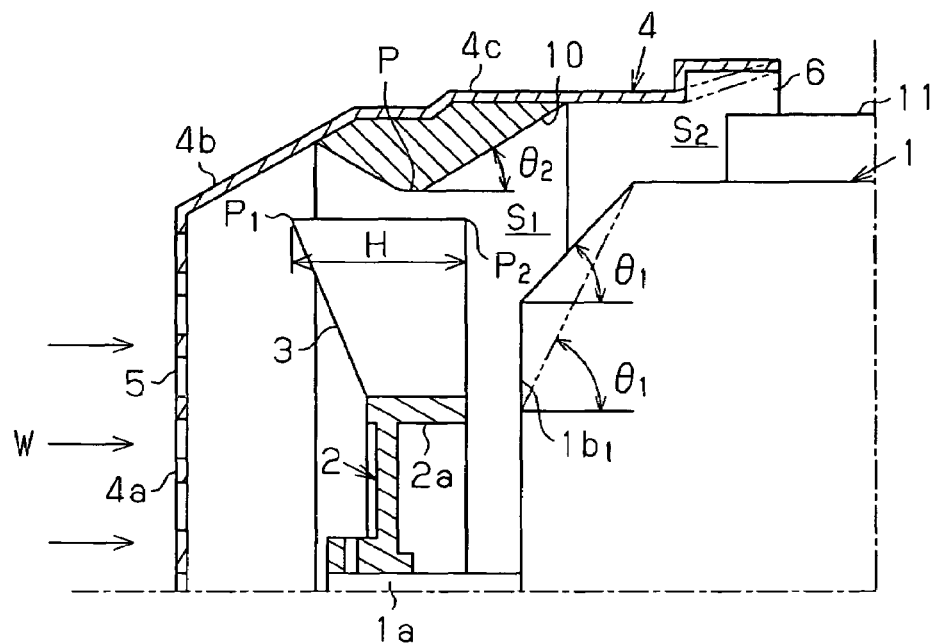
FIG. 5 is a cross-sectional view showing a motor cooling device according to a fifth embodiment of the present invention.
Figure 6:
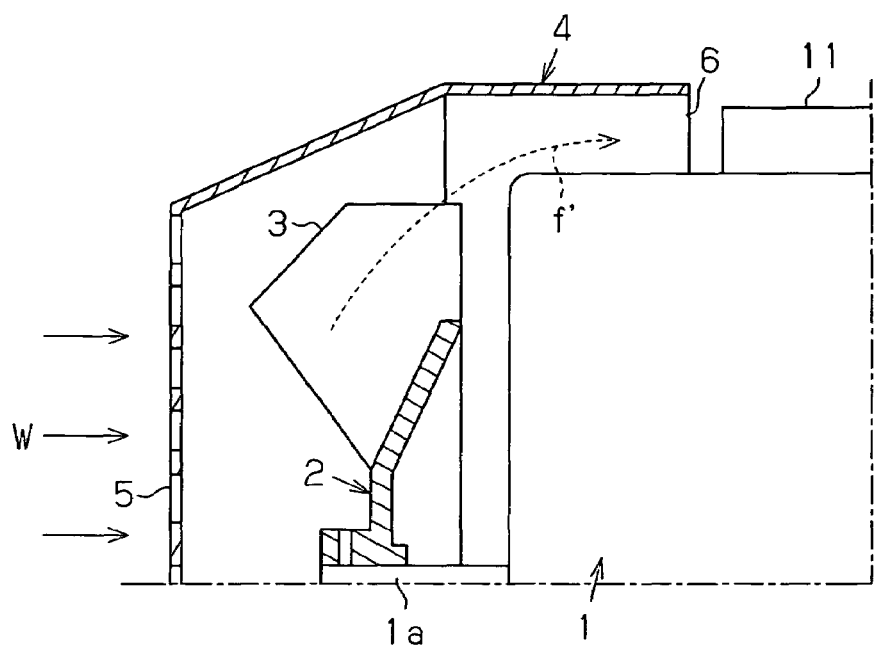
FIG. 6 is a cross-sectional view showing a motor cooling device in the prior art.

FIG. 5 shows a motor cooling device according to a fifth embodiment of the present invention.

In this case, a propeller fan impeller having vanes with front rims facing toward the air entering direction is employed as the impeller 2. An annular fan guide 12 is arranged on the inner surface of the generally cylindrical portion 4c of the fan cover 4 at a portion generally facing towards the periphery of the propeller fan impeller 2. The fan guide 12 is formed so that it gradually becomes small in the flow direction at the inlet side, its smallest cross-section position P is located within the range of the peripheral end of the vane 3 of the propeller fan impeller 2, and its outlet side inner surface forms an inclined surface that is gradually enlarged. The inclined surface forms the space formation member 10 of the constricting flow space $S_1$. Accordingly, the fan guide 12, which defines an inlet region and an outlet region of the propeller fan impeller 2, also functions as the space formation member 10. When H represents the height from the front rim peripheral position $P_1$ of the vane 3 to the vane rear rim peripheral position $P_2$, it is preferred that the smallest cross-section position P be in the range of 0.5H through H from the front end peripheral position $P_1$ of the vane 3. In the present embodiment, the downstream end of the enlarging flow passage $S_2$ encases the end portion of the cooling fin 11 of the motor 1. However, in the same manner as in the second embodiment, the downstream end of the enlarging flow passage $S_2$ may face towards the end portion of the cooling fin 11 of the motor 1. Further, the motor end surface 1b may have a front end $1b_1$ extending either outward from the outer diameter of a hub 2a of the propeller fan impeller 2 as shown by the solid line or inward from the outer diameter of the hub 2a of the impeller 2 as shown by the broken line.

The remaining structure and advantages are the same as the first and third embodiments and thus will not be described.

The invention claimed is:

1. A motor cooling device including an impeller, which is supported by a rotary shaft of a motor, and a fan cover, which encases a front portion and a peripheral portion of the impeller and has an air inlet in a front surface and an air outlet in the rear, the motor cooling device comprising:
   a constricting flow space arranged at an exit side of the impeller and defined by a motor end surface, which includes an entrance in the proximity of a rear surface of a vane of the impeller and a circumferential surface expanding radially and diagonally in the rearward direction,
   a space formation member, which is formed on an inner surface of the fan cover, and an annular partition plate, which extends from the air inlet toward the impeller, the annular partition plate having an outer diameter smaller than an outer diameter of the impeller, said annular partition plate having an inwardly extending flange in proximity of a front surface of said vane.

2. The motor cooling device according to claim 1, wherein an enlarging flow passage enlarged toward the air outlet and arranged downstream from the constricting flow space.

3. The motor cooling device according to claim 2, wherein the enlarging flow passage includes a downstream end facing toward the end portion of the cooling fin.

4. The motor cooling device according to claim 1, wherein a radial plate impeller is employed as the impeller.

5. The motor cooling device according to claim 1, wherein a propeller fan impeller is employed as the impeller.

6. The motor cooling device according to claim 1, wherein said inwardly extending flange extends parallel to the front surface of the vane.

7. The motor cooling device according to claim 6, wherein the inwardly extending flange has a trapezoidal cross-section.

8. The motor cooling device according to claim 1, wherein the vane has a front surface distal portion that protrudes to the air inlet, and wherein the partition plate has an inner diameter, which is larger than the inner diameter of the front surface distal portion of the vane.

* * * * *